(12) United States Patent
McCaughan et al.

(10) Patent No.: US 7,865,048 B2
(45) Date of Patent: *Jan. 4, 2011

(54) NESTED WAVEGUIDES

(75) Inventors: Leon McCaughan, Madison, WI (US); Chad Staus, Portland, OR (US); Thomas F. Kuech, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 196 days.

This patent is subject to a terminal disclaimer.

(21) Appl. No.: 12/208,026

(22) Filed: Sep. 10, 2008

(65) Prior Publication Data

US 2009/0067036 A1 Mar. 12, 2009

Related U.S. Application Data

(63) Continuation-in-part of application No. 11/617,475, filed on Dec. 28, 2006, now Pat. No. 7,515,801.

(51) Int. Cl.
*G02B 6/00* (2006.01)
(52) U.S. Cl. ............................ 385/122; 385/129
(58) Field of Classification Search ................ 385/122, 385/129
See application file for complete search history.

(56) References Cited

U.S. PATENT DOCUMENTS 6,815,683 B2 11/2004 Federici et al.
6,856,746 B2 2/2005 Burrows et al.
7,173,755 B2 2/2007 Huang et al.
7,515,801 B2 * 4/2009 McCaughan et al. ........ 385/122
2005/0213195 A1 9/2005 Belyanin et al.
2008/0159342 A1 7/2008 McCaughan et al.

FOREIGN PATENT DOCUMENTS

JP 03-187290 B2 5/2001

OTHER PUBLICATIONS

Thompson, D.E., et al., "Step-Tunable Far Infrared Radiation by Phase Matched Mixing in Planar-Dielectric Waveguides," IEEE Transactions on Microwave Theory and Techniques, vol. MTT-22, No. 12, pp. 995-1000, Dec. 1974.
Eda, K., et al., "Novel Composite Piezoelectric Materials Using Direct Bonding Techniques," IEEE Ultrasonics Symposium, pp. 921-924, 1995.
Baldi, P., et al., "Nonlinear phase shift at 1.55 μm in CW single-pass waveguided cascaded parametric interactions," CLEO '99, pp. 380-381, 1999.
Chou, M.H., et al., "Multiple-channel wavelength conversion by use of engineered quasi-phase-matching structures in LiNbO3 waveguides," Opt. Lett. 24, pp. 1157-1159, 1999.

(Continued)

*Primary Examiner*—Jennifer Doan
(74) *Attorney, Agent, or Firm*—Bell & Manning, LLC

(57) ABSTRACT

A radiation source or detector including a nested waveguide structure is provided. A smaller waveguide provides wave guiding for radiation of shorter wavelength. The smaller waveguide is embedded within a larger waveguide that provides wave guiding for radiation of longer wavelength. Wavelength conversion between the shorter wavelength and the longer wavelength can be realized through a nonlinear process.

22 Claims, 7 Drawing Sheets

OTHER PUBLICATIONS

Avetisyan, Y., et al., "Analysis of THz-wave surface-emitted difference-frequency generation in periodically poled lithium niobate waveguide," Appl. Phys. B 73, pp. 511-514, 2001.

Suhara, T, et al., "Theoretical Analysis of Laterally Emitting Terahertz-Wave Generation by Difference-Frequency Generation in Channel Waveguides," IEEE Journal of Quantum Electronics, vol. 39, No. 1, Jan. 2003.

Shi, W., et al., "Designs of terahertz waveguides for efficient parametric terahertz generation," Applied Physics Letters, vol. 82, No. 25, pp. 4435-4437, Jun. 23, 2003.

Mueller, Eric R., "Terahertz Radiation: Applications and Sources," The Industrial Physicist, pp. 27-29, published by American Institute of Physics, Aug./Sep. 2003.

Cao, H., et al., "Broadband generation of terahertz radiation in a waveguide," Optics Letters, vol. 29, No. 15, pp. 1751-1753, published by Optical Society of America, Aug. 1, 2004.

Ward, D.W., et al., "Terahertz wave generation and propagation in thin-film lithium niobate produced by crystal ion slicing," Applied Physics Letters 86, 022908, Jan. 6, 2005.

Wallace, V., "Terahertz methods show promise for breast cancer," Laser Focus World, www.laserfocusworld.com, pp. 83-85, Jun. 2006.

The International Search Report and The Written Opinion for PCT/US2009/046430 filed on Jun. 5, 2009, mailed Jan. 27, 2010.

Staus, C., "Continuously phase-matched terahertz difference frequency generation in an embedded-waveguide structure supporting only fundamental modes", Optic Express, vol. 16, No. 17, Aug. 18, 2008.

* cited by examiner

NESTED WAVEGUIDES

STATEMENT OF GOVERNMENT RIGHTS

This invention is made with United States government support awarded by the National Science Foundation under grant number 0505775. The United States government has certain rights in this invention.

FIELD OF THE INVENTION

This invention is related to waveguides. More specifically, this invention is related to waveguides having a multiple, nested waveguide structure. The waveguides can be used to generate output radiation in a desired wavelength range or to detect input radiation.

BACKGROUND OF THE INVENTION

Frequency conversion, either up-converting from a lower frequency (longer wavelength) to a higher frequency (shorter wavelength), or the opposite down-conversion, is used to generate output radiation from input radiation of different frequencies to cover gaps in spectral regions of interest. For example, Terahertz (THz) radiation is of great interest for communication and imaging applications and shows promise for ultra-wideband wireless communications, homeland security, medical imaging, and defense imaging applications, among others. Due to their high sensitivity and selectivity, THz-based systems can be used to monitor public facilities, high-occupancy buildings, and even the open air for toxic industrial chemicals, chemical agents, biological agents, and trace explosives in a continuous and autonomous manner. In particular, because of its superior ability to penetrate through many materials, THz radiation is well-suited for the detection and imaging of chemical and biological weapons concealed under clothing. In addition, wavelengths (e.g., 10 microns-3 millimeters) in the THz range (e.g., 0.1 THz-30 THz) may resonate with many biological molecules, including strands of DNA, in a unique manner. As a result, THz sources may also be used as sensors for the early detection of bioaerosols such as spores, bacteria, viruses, and pathogens.

The ready availability of powerful visible and near-IR laser sources makes second order nonlinear optical processes an attractive mechanism for producing THz radiation. In particular, difference frequency generation (DFG), in which coherent mixing produces the THz radiation field, $E(\omega_3) \propto E(\omega_1)E^*(\omega_2)$, from two input pumps, can be used to produce a spectrally pure, potentially tunable, room temperature THz light source. Unfortunately, the lack of sufficiently powerful compact THz sources and detectors, particularly in the 0.3 to 30 THz range, has drastically limited the development of THz sources for use in many applications.

SUMMARY OF THE INVENTION

Nested waveguides having at least one inner waveguide embedded in an outer waveguide are provided. In one basic embodiment, a nested waveguide comprises a first waveguide configured to guide at least one pump beam and a second waveguide configured to guide at least one product beam generated via a nonlinear optical process from the at least one pump beam, wherein one of the first or second waveguides is embedded within the other of the first or second waveguides. Such a nested waveguide can include a first inner cladding layer comprising a non-linear optic material, a second inner cladding layer comprising a non-linear optic material and a core layer comprising a nonlinear optic material sandwiched between the first and second inner cladding layers. The nested waveguide may further include at least one outer cladding layer disposed outside of the first or second inner cladding layers. In one specific embodiment of the nested waveguide, the core layer comprises a first gallium arsenide-based material (e.g., $Al_{0.16}Ga_{0.84}As$) and the first and second inner cladding layers comprise a second gallium arsenide-based material having an aluminum concentration higher than that of the first gallium arsenide-based material (e.g., $Al_{0.18}Ga_{0.82}As$).

Methods for generating or detecting radiation using nested waveguides comprising a first waveguide embedded within a second waveguide are also provided. The methods include the steps of directing input radiation comprising at least one pump beam into the nested waveguide, wherein the at least one pump beam is guided by one of the first or second waveguides and output radiation comprising at least one product beam is generated via a nonlinear optical process from the input radiation, and further wherein the at least one product beam is guided by the other of the first or second waveguides.

Systems for frequency conversion are also provided. Such systems include at least one input radiation source configured to generate input radiation and a nested waveguide configured to receive the input radiation, wherein the nested waveguide includes a first waveguide configured to guide the input radiation and a second waveguide configured to guide output radiation generated via a nonlinear optical process from the input radiation.

Further objects, features, and advantages of the invention will be apparent from the following detailed description when taken in conjunction with the accompanying drawings.

DETAILED DESCRIPTION OF THE INVENTION

Figure 1:
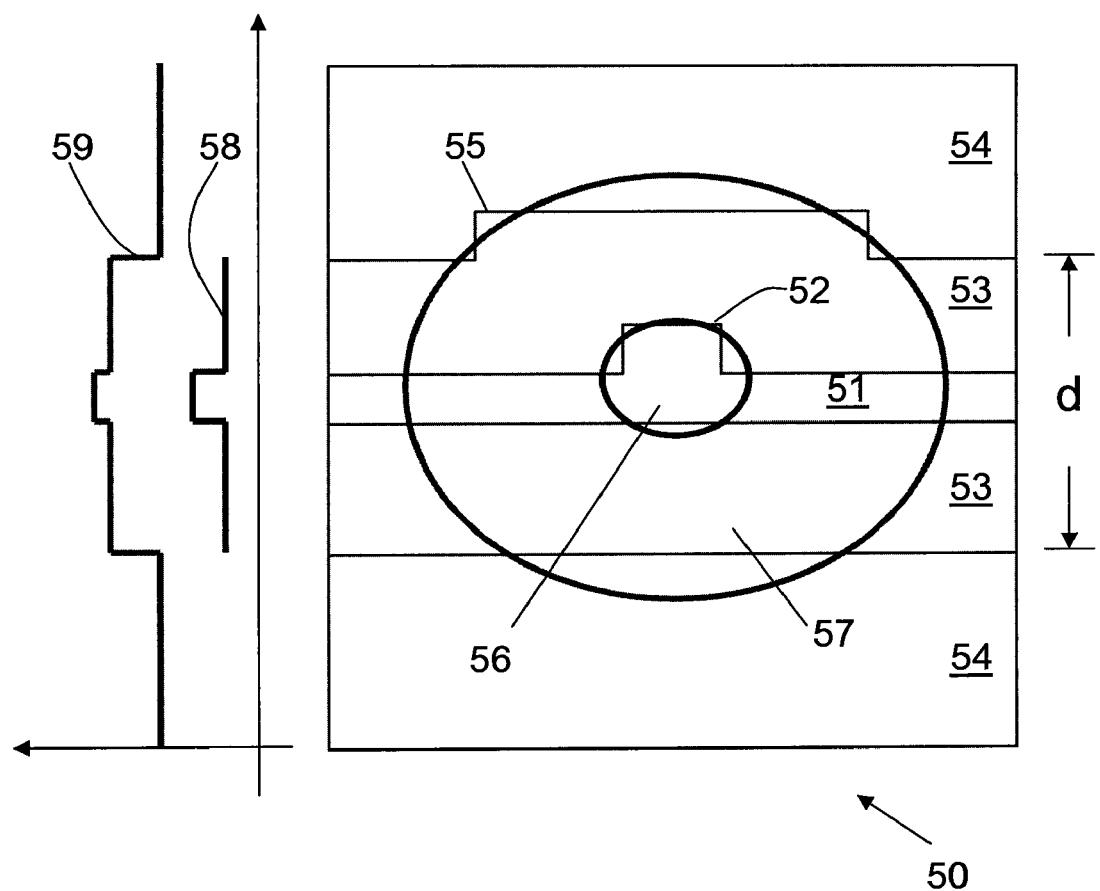
FIG. 1 is a cross-sectional view of a nested waveguide.

The present invention provides waveguides with a nested structure, methods for generating radiation using the nested waveguides and systems that incorporate the nested waveguides. The nested waveguides can be used to generate output radiation across a range of frequencies via nonlinear optical processes, such as difference frequency generation (DFG), second harmonic generation (SHG), sum frequency generation (SFG), optical parametric generation (OPG), and stimulated polariton scattering (SPS). For example, in some embodiments the nested waveguides can be designed to generate THz radiation via a DFG process. In other embodiments, the nested waveguides can be designed to detect THz radiation using DFG or SFG.

The waveguides can enhance the conversion efficiency of nonlinear processes by providing strong optical confinement of input and output radiation, collinear propagation without diffraction, increased interaction length between the input and output radiation, improved overlap of input radiation and output radiation, and/or waveguide dispersion for improved collinear phase matching. This latter attribute can provide for continuous phase matching between the pump and product beam(s) that make up the input and output radiation, each of which can be made to be supported as single transverse modes for optimum overlap in the nested waveguide structure. This also eliminates the wasteful coupling of light into higher order modes (with unmatched phase relations), prevalent in bulk and standard waveguide configurations. As a result, the nested waveguide structures can be designed to achieve a net gain at significantly lower pump powers than bulk-material-based devices with a power conversion efficiency comparable to, or better than, other methods of radiation production (e.g., the quantum cascade laser or photo-mixing). In addition, the nested waveguides have a nonlinear input to output power relationship, a small footprint, and do not require cooling.

The basic structure of the nested waveguides includes an inner waveguide contained within an outer waveguide. This basic structure can be used to generate output radiation or to detect input radiation. In either case, input radiation, which comprises at least one pump beam, is directed into an inner (embedded) waveguide or outer (surrounding) waveguide. The frequency of the pump beam radiation can be up- or down-converted to generate the output radiation, which comprises at least one product beam guided by the inner waveguide or the outer waveguide, and outputted from the nested waveguide. When the nested waveguide is used as a radiation generator, the pump beam(s) are selected to generate output radiation of a desired wavelength for use in a selected application. When the nested waveguide is used as a radiation detector, the radiation to be detected provides at least one pump beam and the output radiation is used as a means to signal that the radiation of interest has been detected.

In one mode of operation, an inner waveguide is configured to receive and guide one or more pump beams of a higher frequency, and an outer waveguide is configured to guide output radiation of a lower frequency. This is termed difference frequency generation (DFG) or parametric down conversion. This configuration may be used to produce low frequency (long wavelength) light, such as THz (far-infrared) light from higher frequency (shorter wavelength) near-infrared light. For example, two input pump beams at 1.5546 μm and 1.5436 μm guided by the inner, embedded waveguide of the nested structure can generate a coherent THz output product beam at 1.38 THz (218 μm), guided by the outer waveguide, via continuously phase matched DFG.

In an alternative mode of operation, the same nested waveguide structure which is capable of producing coherent output THz light by DFG can be used to detect input THz light by employing the complementary process. In this case, THz radiation at frequency $\omega_{THz}$, incident on the nested waveguide is guided by the outer waveguide and serves as a first pump beam. A higher frequency second pump beam, at frequency $\omega_2$, guided by the embedding waveguide, is made to overlap with the THz pump beam and the same phase-matching condition that produced output THz radiation via DFG in the previously-described mode of operation now produces a longer wavelength product beam (output radiation) via SFG, $\omega_1=\omega_{THz}+\omega_2$, thereby signaling the successful detection of the THz radiation. Alternatively, the THz radiation and a high frequency pump beam at frequency $\omega_1$ can be mixed to produce lower frequency output radiation $\omega_2=\omega_1-\omega_{THz}$, also signaling the successful detection of the THz radiation. This detection process, which converts the long wavelength (low frequency) THz signal to a higher frequency shifts the THz signal away from the large thermal blackbody background and allows the use of inexpensive near-IR or visible solid state detectors. The coherent nature of the detection also allows detection of both signal magnitude and phase.

By way of illustration, FIG. 1 is a cross-sectional view of a nested waveguide suitable for generating or detecting radiation. The nested waveguide 50 comprises a first waveguide embedded in a second waveguide. In this example, the first waveguide can be configured to guide higher frequency input radiation comprising one or more pump beams 56 and the second waveguide can be configured to guide lower frequency output radiation 57 generated via a nonlinear optical process from the one or more pump beams. As shown, the nested waveguide 50 of FIG. 1 comprises a first waveguide comprising a first core layer 51 of higher refractive index than the surrounding first inner cladding layers 53. This first waveguide is embedded (or "nested") in a larger second waveguide, and serves as the core for the second surrounding waveguide. That is, the second waveguide is comprised of a multilayer core, 51 and 53, which is surrounded by outer cladding layers 54 having lower refractive indices than any of the core materials at the pertinent guiding wavelength. By way of illustration, the respective refractive index profiles for the materials making up the first (embedded) waveguide at near-infrared frequencies, and second (surrounding) waveguide at THz frequencies are depicted in FIG. 1 as curves 58, 59, respectively. (As would be recognized by those of ordinary skill in the art, the waveguides are not strictly defined by exact layers in the structure due to the evanescent fields of the radiation.)

Since the nonlinear optical process requires that the optical fields of the pump(s) and product(s) overlap, any or all of the layers in which overlap occurs can be made of a $2^{nd}$ order nonlinear material. The nonlinear optic layer(s) can be considered a "gain medium," in the sense that while the input radiation is propagated along the nonlinear optic layer(s), it is continuously converted to the output radiation. First inner cladding layer 53 can also include a ridge portion 55 to provide lateral confinement of the radiation propagated by the outer waveguide.

Although much of the preceding discussion is directed to the generation or detection of THz radiation, the present nested waveguides can be designed to generate and detect radiation with a wide range of frequencies using various non-linear processes. By way of illustration only, the outer waveguide may be configured to receive and guide input radiation of a lower frequency, which is up-converted to output radiation of a higher frequency which propagates in the inner waveguide. This latter configuration may be used for second harmonic generation (SHG). For example, solid state visible light sources in the green (e.g., 530 nm) can be generated from 1060 nm GaInAs/AlGaAs strained quantum well DBR lasers. Solid state visible light sources in the red (e.g., 620 nm) can be generated from 1240 nm strained InGaAs diode lasers. Ultraviolet light derived from SHG of visible light has applications in a wide variety of industries, including electronic manufacturing (UV photolithography), high density recording, and photochemical processing. Since the SHG products (e.g., 530 nm and 620 nm, respectively) have significantly smaller wavelengths than their pump counterparts (e.g., 1060 nm and 1240 nm, respectively) in these examples, the nested waveguide structure could be designed to propagate the second harmonic product as single transverse modes in a smaller waveguide nested inside a larger waveguide which supports single mode pumps.

The waveguides can be constructed from a variety of materials. However, the following general properties should be considered in selecting materials for the waveguides. The core and cladding materials making up the pump waveguide(s) should exhibit low loss at the pump frequency or frequencies and the corresponding materials comprising the product waveguide(s) should exhibit low loss at the product frequency or frequencies. Cladding materials should have a lower refractive index than core materials for their respective propagation frequencies (pumps or products). It is not necessary that the cladding layers be the same above and below their respective core. Cladding materials for the embedded waveguide(s) should be sufficiently thick, preferably, but not necessarily, at least 10 times the wavelength of the light, in order to isolate the radiation propagated by the inner waveguide from being influenced by the choice of materials or dimensions of the outer waveguide. To provide efficient input and output coupling, and to achieve good overlap of the optical fields, both of the waveguides (i.e., the embedded and the surrounding guides) are desirably single mode for the respective radiation they are transporting (i.e., pump(s) and product(s)).

In order to maximize the range of THz wavelengths that may be produced, it is desirable to meet the phase matching condition, $\beta_3 = \beta_1 - \beta_2$ for a wide combination of pumps, $\omega_1$ and $\omega_2$, such that $\omega_3 = \omega_1 - \omega_2$. This can be achieved by varying the refractive indices of the inner cladding and outer cladding layers to produce a flatter dispersion relation so as to produce phase matching ($\Delta\beta = \beta_1 - \beta_2 - \beta_3 \sim 0$) for a wider THz frequency range. The index variation can be continuously varied (so-called graded index) or stepped, using the same approach used in dispersion-flattened optical fibers, to produce a constant low level of dispersion over a wide range of transmitted wavelengths.

The various layers of the waveguides can have a range of dimensions (e.g., layer thicknesses, ridge heights, and ridge widths). In general, increases in any of these dimensions or in the refractive index contrast between core and cladding produce a stronger optical confinement. However, excessive increase in these parameters can cause additional optical modes to be transported (i.e., the waveguide can become multimoded). In some embodiments the inner (embedded) waveguide has sufficiently strong optical confinement that the optical field or fields carried by the inner waveguide are not influenced by the choice of outer cladding layers. This makes it possible to select the outer cladding materials and/or the geometry of the outer waveguide independently from the inner waveguide so that the outer waveguide can be designed to achieve single mode operation with good mode confinement and phase matching between the inner and outer modes.

Although the nested waveguides have been described and depicted with a planar geometry, the nested waveguide structure is not so limited (with or without optical lateral confinement by way of ridges). This structure can be reproduced with, for example, a circular symmetry, i.e., as a cylindrical optical waveguide embedded in an outer (cylindrical or planar) waveguide (i.e., analogous to an optical fiber buried within a larger optical fiber).

The invention will be further described by reference to the following examples which are presented for the purpose of illustration only and are not intended to limit the scope of the invention.

EXAMPLE 1

THz Generation Using a AlGaAs-Based Dual Waveguide

Figure 2A:
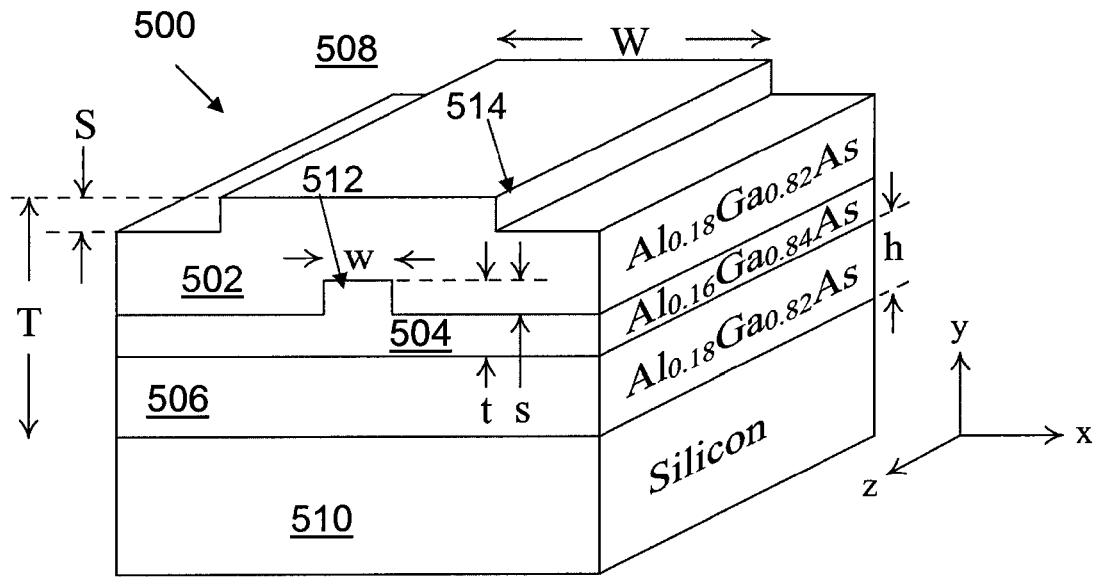
FIG. 2A is a perspective view of an AlGaAs-based nested waveguide.
Figure 2B:
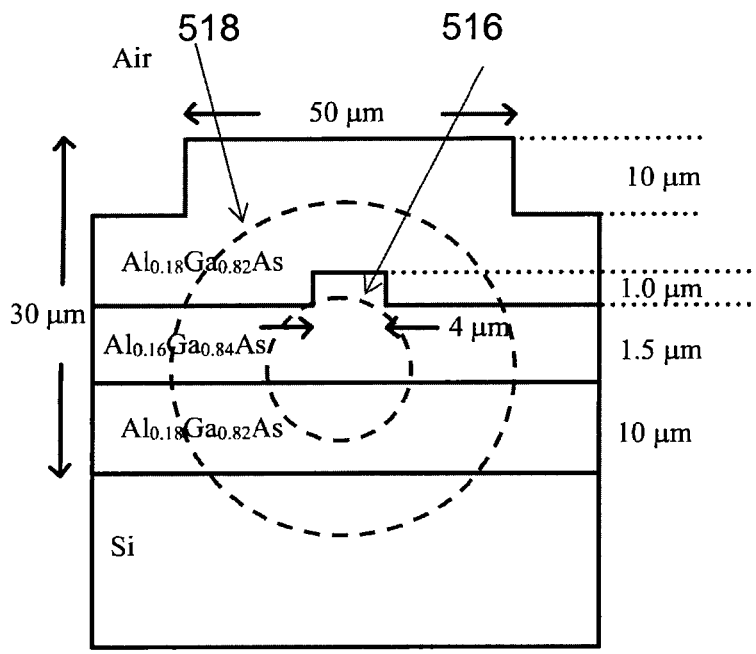
FIG. 2B is a cross-sectional view of an AlGaAs-based nested waveguide, showing exemplary dimensions.

The nested waveguide of FIG. 2 shows a specific example of a nested waveguide that can efficiently produce guided wave single-mode THz (far-infrared) light 518 by DFG with little or no phase mismatch between the two single mode guided wave near-infrared pumps 516 (e.g., 1.535 μm and 1.563 μm) and the THz product (e.g., 3.5 THz or 85.75 μm). The nested waveguide of FIG. 2 comprises an inner waveguide comprising a core layer 504, and inner cladding layers 502 and 506. The core of the outer waveguide comprises the multilayer structure (502, 504 and 506) of the inner waveguide along with at least one outer cladding layer 510. (As shown, the second outer cladding is provided by air 508. Alternatively, outer cladding layer 510 could also be replaced by air.) The ridge 512 on the core of the inner waveguide provides lateral confinement for the near-IR pump optical fields, and the ridge 514 on the core of the outer waveguide laterally confines the THz optical field generated by DFG. The inner core layer 504 is about 3 μm thick and each inner cladding layer (502 and 506) is about 10 to 20 μm thick. Although the waveguide depicted in FIG. 2 includes a ridge 512 for confining optical pump beams 516 laterally, other shapes are possible for realizing confinement of the optical pump beams. For example, another nonlinear material in the form of a channel (e.g., a rectangular parallelepiped) with refractive index larger than that of the inner cladding layers (502 and 506) could be used in place of the inner core layer 504 without resorting to the ridged structure 512.

The THz waveguide of FIG. 2 can be used to generate output THz radiation by directing two optical pump beams into the dual waveguide. When properly phase matched, the two pump beams coupled to the inner optical waveguide will produce a guided mode (typically, but not necessarily, the fundamental mode) at THz frequencies via the DFG process. Once produced, the THz beam is propagated in the larger outer THz waveguide with low THz loss.

In one embodiment, the inner waveguide comprising an inner core 504 and inner cladding layers 502 and 506 is composed of $Al_xGa_{1-x}As$, where the fractional aluminum concentration, x, may be zero for the inner core 504. A major absorption feature of $Al_xGa_{1-x}As$ is two-photon absorption of the pump light. Assuming a minimum pump wavelength of 1.535 μm, two-photon absorption can be avoided by making the bandgap of the inner waveguide greater than 1.616 eV, corresponding to replacing some of the Ga with an aluminum concentration greater than 16%. In this case the absorption coefficient is small and so there is no need to minimize the thickness of the nonlinear region. Taking advantage of the fact that the refractive index of $Al_xGa_{1-x}As$ decreases with increasing Al fraction, x, the inner waveguide core layer 504 and cladding layers 502 and 506 can be made using different AlGaAs concentrations, as shown in FIG. 2.

The nested waveguide structure of FIG. 2 further includes a Si substrate which serves as one of the outer cladding layers 510. The upper and lower outer cladding layers may be, for example, air, Si, $SiO_2$ (quartz or silica), or aluminum oxide ($Al_2O_3$). In the embodiment of FIG. 2, silicon is selected as the lower cladding layer 510 because it has a low absorption ($2\alpha=0.1$ cm$^{-1}$) and a refractive index only slightly smaller than that of AlGaAs in the THz (~3.4), helping to ensure that the THz waveguide supports only a single mode. Air serves as the upper cladding layer 508 of the outer (THz) waveguide shown in FIG. 2.

Nested waveguides of the type depicted in FIG. 2 can be made using known semiconductor deposition and processing techniques. The devices and the individual layers can be grown to precise thicknesses using standard chemical vapor deposition (CVD), liquid phase epitaxy (LPE) or molecular beam epitaxy (MBE) techniques. For example, to produce the waveguide of FIG. 2 a pump waveguide can be fabricated by sequentially growing the $Al_{0.18}Ga_{0.82}As$ and $Al_{0.16}Ga_{0.84}As$ layers on a GaAs substrate (not shown), etching the ridge structure into the $Al_{0.16}Ga_{0.84}As$ layer, and growing the final $Al_{0.18}Ga_{0.82}As$ layer over the ridge. The THz waveguide can be constructed by bonding the AlGaAs heterostructure to a silicon substrate, removing the exposed GaAs substrate by mechanical and chemical means (an AlGaAs layer with high Al concentration, e.g., x~0.8; or an added InGaP layer can be added as an etch stop), and then etching the THz ridge structure. The ability to construct the apparatus via well established chemical vapor deposition techniques allows for lower cost, scalable production when compared to existing sources.

The AlGaAs heterostructure can be grown along the [100] or [110] or [111] crystallographic directions. For the [110] direction the two near-IR pumps are polarized perpendicular to the plane of the AlGaAs films and excite a THz field polarized parallel to the plane of the films. The pump and THz ridge waveguide features are aligned along the [$\bar{1}$10] direction. The AlGaAs heterostructure can also be grown along the [111] crystallographic direction, in which case the two near-IR pumps are also polarized perpendicular to the plane of the AlGaAs films and excite a THz field also polarized perpendicular to the plane of the films. The two waveguides may be directed anywhere in the film plane. The AlGaAs heterostructure can also be grown along the [100] direction, in which case the pumps are polarized parallel to the film plane and the THz field polarized perpendicular to the film plane. The pump and THz ridge waveguide features are then aligned along the [011] or [0$\bar{1}$1] directions. The [111] orientation is preferred because it has a larger effective nonlinearity $$d_{\text{eff}} = \frac{2}{\sqrt{3}} d_{14},$$

compared to $d_{\text{eff}} = d_{14}$ for the [110] and [100] directions.

Although the nested waveguides of FIGS. 1 and 2 comprise two nested waveguides and may be referred to as dual embedded waveguide structures, more waveguides may be nested together to create other multiple (e.g., 3 or more) waveguide structures. For example, a plurality of smaller waveguides may be contained within a larger waveguide. The plurality of smaller waveguides themselves may be in a nested configuration, in parallel or in other configurations.

EXAMPLE 2

Normalized Power Conversion Efficiency for THz Waveguides

Figure 3:
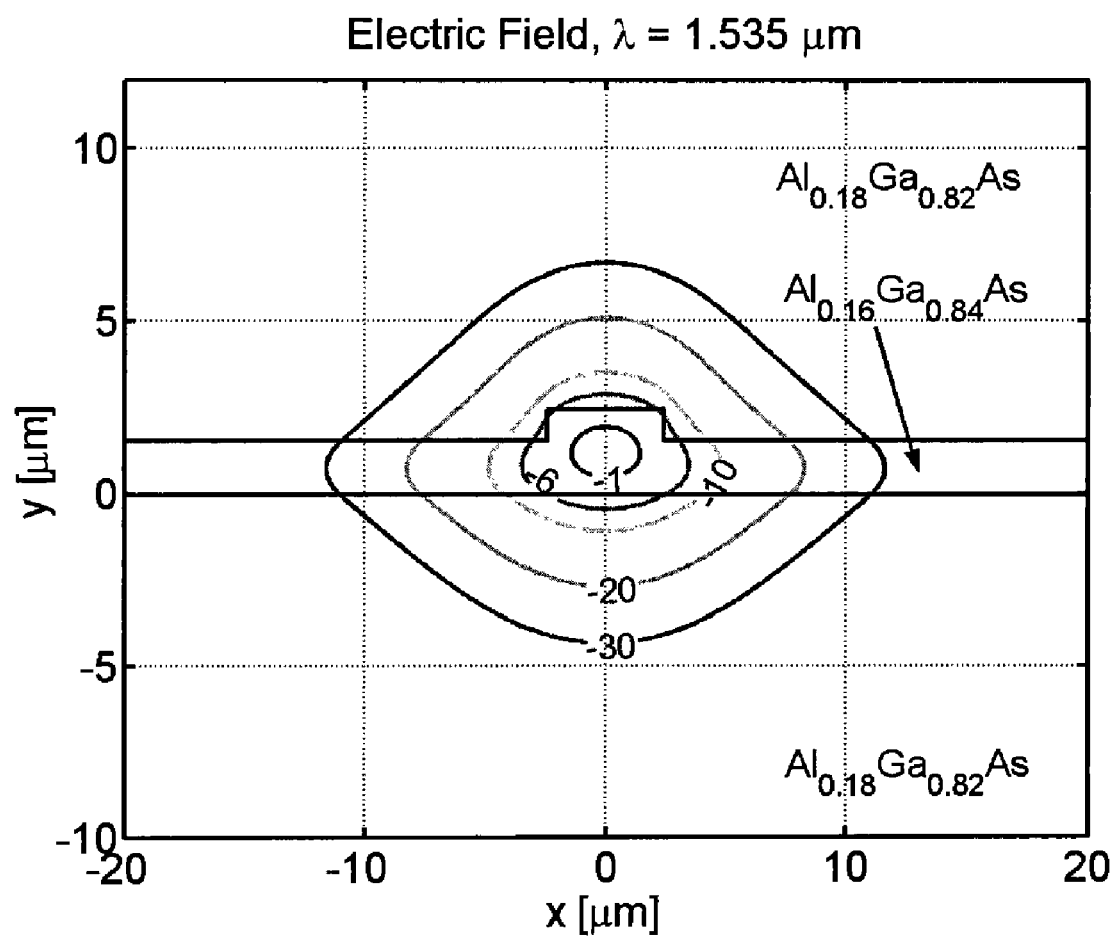
FIG. 3 is a cross-sectional view of the calculated electric field distribution of the waveguide shown in FIG. 2A.

This example presents an analysis of the phase matching and normalized power conversion efficiency of the THz nested waveguide shown in FIG. 2. In order to take advantage of the ready availability of fiber-based optical circuit elements (pigtailed laser diodes, fiber amplifiers, polarization controllers, etc.), the pump ridge waveguide was designed for single mode operation and good mode overlap with a 1.55 μm optical fiber. Mode field calculations were carried out and are shown in FIG. 3. These calculations show that the pump modes are not influenced either by the THz waveguide geometry (dimensions T, S, and W in FIG. 2A) or the choice of THz cladding materials (Si and air, in this case) when the $Al_{0.18}Ga_{0.82}As$ cladding layers of the pump ridge structure are greater than ~7 μm. As a result, these parameters can be used to independently design the THz waveguide for single mode operation, good mode confinement, and phase matching with the two near-IR pumps. Assuming a minimum pump wavelength of 1.535 μm, two-photon absorption, $2\hbar\omega_1=1.616$ eV, can be avoided by using $Al_xGa_{1-x}As$ with an aluminum concentration greater than 16% (i.e., $E_g[\text{eV}]=1.424+1.24x \geq 2\hbar\omega_1$, where $E_g$ is the bandgap of AlGaAs.

One measure of the DFG efficiency of the waveguides is the normalized power conversion efficiency, $\eta_p = P_3/P_1P_2$, where $P_1$, $P_2$, and $P_3$ are the powers (in Watts) of the first input pump beam, the second input pump beam and the output radiation, respectively. This normalized power conversion efficiency provides a measure of waveguide efficiency that allows for a direct comparison of the performance of different DFG processes, even in situations where they are operated at very different input powers. Based on this normalized measure of conversion efficiency, THz generation via DFG using the present nested waveguides can be several orders of magnitude more efficient than THz generation via DFG using bulk material-based devices. In some embodiments the nested THz waveguides have normalized power conversion efficiencies of $1 \times 10^{-5}$ or better. This calculated normalized power conversion efficiency is based on a theoretical approach to guided wave difference frequency generation which is strictly valid for both transverse electric and transverse magnetic guided modes.

The THz output power, $P_3$, can be derived in terms of the input pump powers, $P_1$ and $P_2$, as $$P_3(L) = \frac{\omega_3^2 \varepsilon_o^2 |\Gamma|^2}{4(\alpha_3^2 + \Delta\beta^2)|\Omega_3|^2} \quad \text{Equation 1}$$

$$P_1 P_2 (e^{-2\alpha_3 L} - 2e^{-\alpha_3 L}\cos(\Delta\beta L) + 1)$$

$$= \eta_p P_1 P_2$$

where $\omega_3$ and $\alpha_3$ are the angular frequency and loss coefficient, respectively, of the THz product. Here the overlap function $\Gamma = \iint d_{\text{eff}} E_{t,1} E_{t,2} E_{t,3} dxdy$ is a measure of the degree which the three optical fields (2 pumps and one THz product) overlap each other and the nonlinear medium, $\Delta\beta = \beta_1 - \beta_2 - \beta_3$ is the propagation constant mismatch between the pumps and THz product, and $\Omega_3$, the normalization constant of the THz light is given by $$\frac{1}{2}\int\int (E_l \times H_n)\cdot \hat{z}\, dxdy = \delta_{nl}\Omega_l \quad (n=3).$$

The transverse waveguide modes are normalized to 1 W and L is the length of the device. This equation is valid regardless of pumps and THz mode polarizations, and includes THz waveguide absorption.

The modal properties of the pump waveguide are determined by the AlGaAs heterostructure and the inner waveguide geometry defined by t, s, and w in FIG. 2A. The refractive index of $Al_xGa_{1-x}As$ as a function aluminum concentration and wavelength can be described by $n(\lambda, x)=n_{GaAs}(\lambda)-0.45x$ for $\lambda>1.1$ μm, where $n_{GaAs}(\lambda)$ is the refractive index of GaAs. The core layer has an aluminum concentration that is 2% less than the surrounding cladding (18%), which corresponds to a positive refractive index difference of 0.009 for $\lambda=1.535$ μm. Given $\Delta n=0.009$, the ridge waveguide geometry was optimized for the fundamental TM mode (E-field ∥ y in FIG. 2) with the largest transverse profile at 1.535 μm (FIG. 3). As a result the FWHM of the ridge mode along y is 3.5 μm, significantly smaller than the 9 μm mode size of standard 1.5 μm optical fiber mode. The pump mode size can be increased along y by reducing the difference in aluminum concentration (and therefore $\Delta n$) between the AlGaAs core and cladding layers.

Figure 4A:
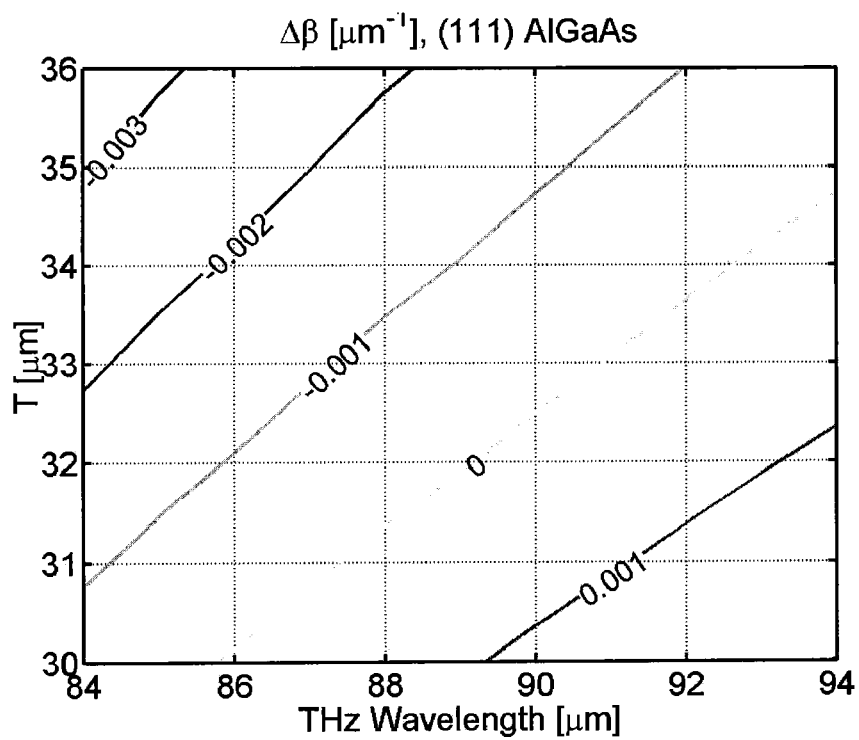
FIG. 4A is a contour plot of the phase mismatch as a function of THz wavelength and the AlGaAs thickness (T) for the (111) AlGaAs crystal orientation.
Figure 4B:
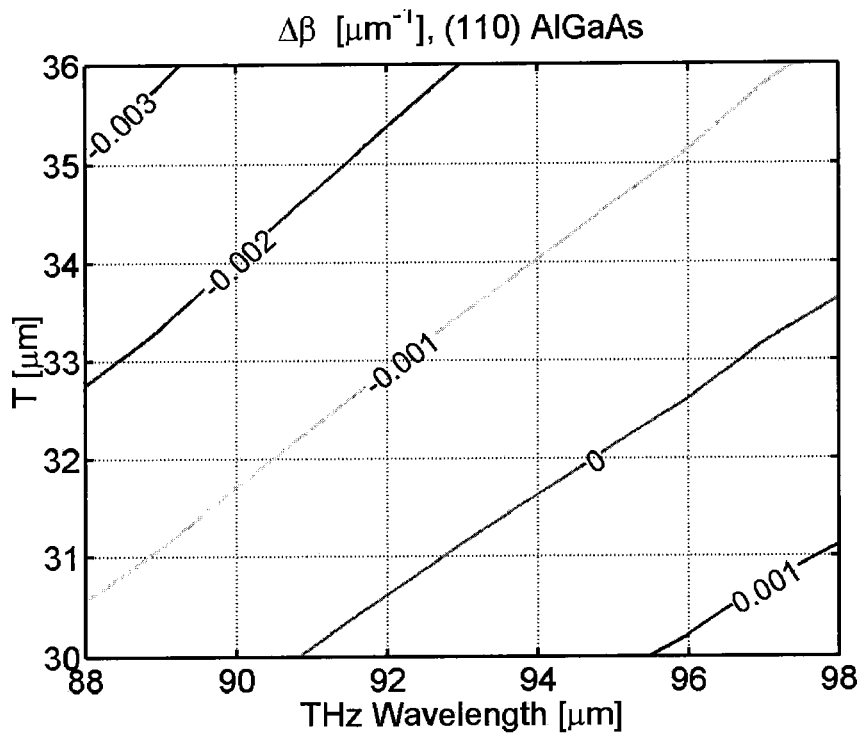
FIG. 4B is a contour plot of the phase mismatch for the (110) AlGaAs crystal orientation.

FIGS. 4A and 4B are contour plots of the phase mismatch $\Delta\beta=\beta_1-\beta_2-\beta_3$ as a function of THz wavelength and total AlGaAs thickness T for the (110) and (111) AlGaAs crystal orientations. The THz ridge shoulder height S and width W were fixed at 15 μm and 50 μm, respectively. The mode propagation constants for the two pumps and THz were calculated using a 3-D beam propagation method. Refractive index data for $Al_xGa_{1-x}As$ in the near-IR and silicon in the THz were taken from E. Palik (Ed.), *Handbook of Optical Constants of Solids*, (Academic Press, Orlando, Fla., 1985) and M. R. Brozel, G. E. Stillman, *Properties of Gallium Arsenide* (The Institution of Electrical Engineers, London, United Kingdom, 1996). All of the AlGaAs layers were assumed to have the same refractive index as GaAs in the THz. The material absorption of GaAs and silicon were included in the THz mode calculations.

Figure 5A:
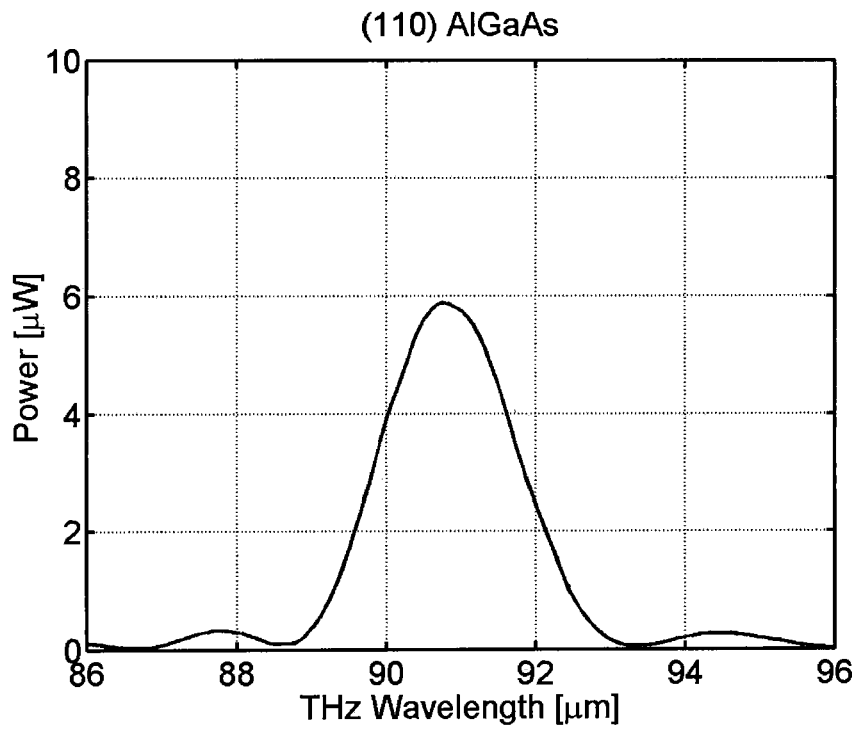
FIG. 5A is a diagram showing the output power versus THz wavelength for the (110) AlGaAs crystal orientation.
Figure 5B:
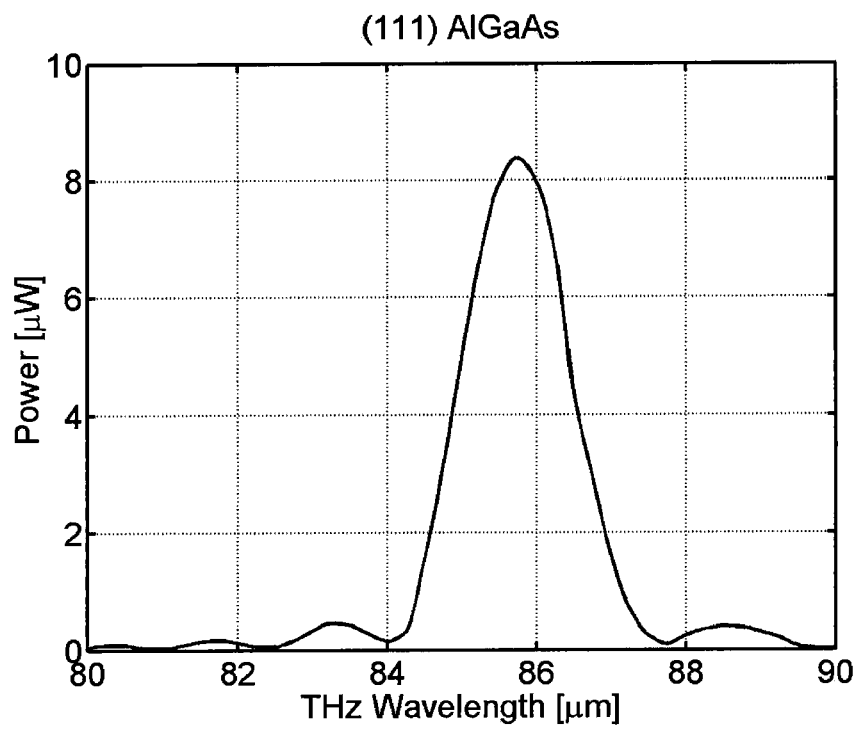
FIG. 5B is a diagram showing the output power versus THz wavelength for the (111) AlGaAs crystal orientation.
Figure 6:
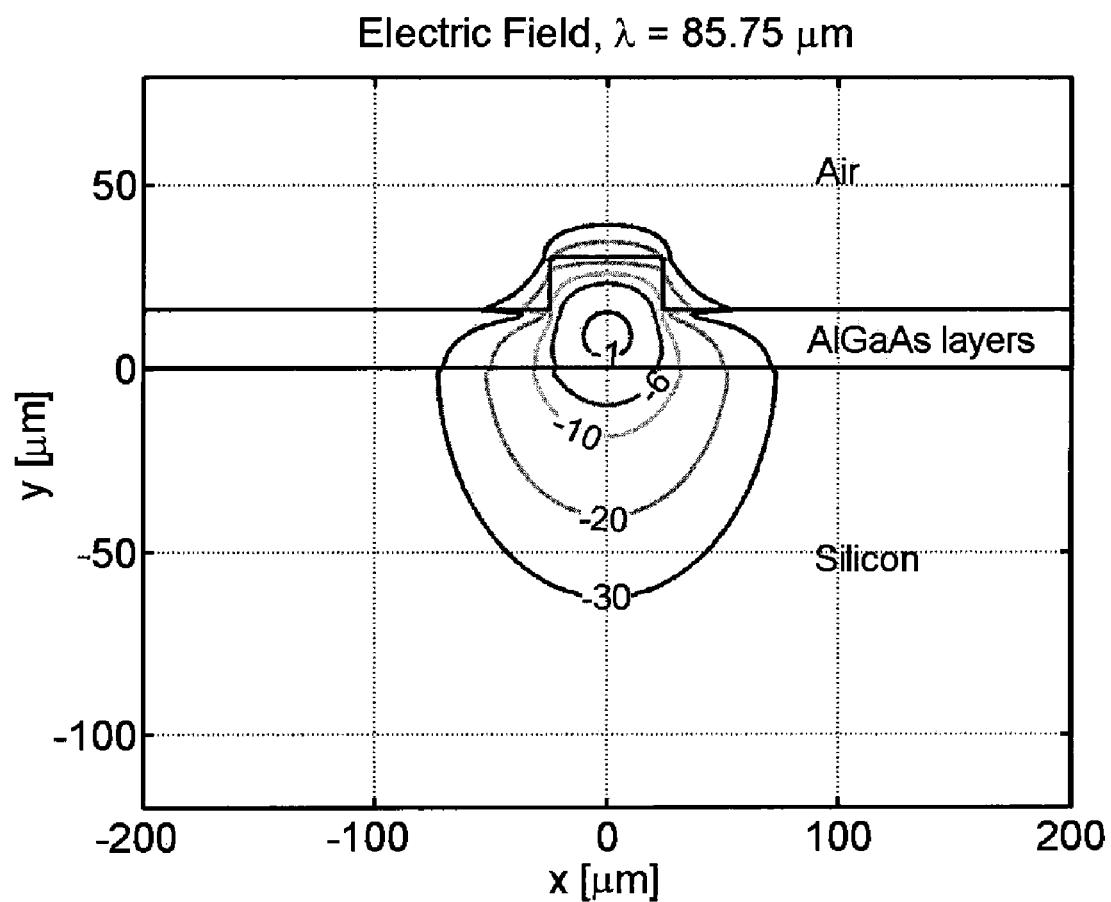
FIG. 6 is a cross-sectional view of the electric field profile of the phase matched THz mode in FIG. 5B.

The THz output power of the AlGaAs nested waveguide structure was calculated using Equation 1 for T=30 μm and the results are shown in FIGS. 5A and 5B. A device length of 11 mm and pump powers of $P_1=P_2=760$ mW, were chosen. A nonlinear coefficient $d_{14}=43$ pm/V was used for GaAs. The output power vs. THz wavelength is shown in FIG. 5B for (111) AlGaAs and FIG. 5A for (110) AlGaAs. A pump waveguide offset of h=10 μm (see FIG. 2A) provided an optimal pump/THz mode overlap. The (111) orientation provided the largest THz output power, 8.4 μW at a wavelength of 85.75 μm (3.5 THz). The maximum output power for the (110) orientation occurred at larger wavelength, 5.9 μW at a wavelength of 90.75 μm (3.3 THz). The DFG power-normalized conversion efficiency, given by $\eta_P=P_3/(P_1P_2)$, for the (111) AlGaAs structure is $\eta_P=1.45\times 10^{-5}$. This result is 2589 times larger than previously reported for THz DFG in bulk material. (See, W. Shi, Y. J. Ding, P. G. Schunemann, "Coherent terahertz waves based on difference-frequency generation in an annealed zinc-germanium phosphide crystal: improvements on tuning ranges and peak powers," *Opt. Commun.*, 233, 183 (2004).) The AlGaAs structure benefits from low waveguide losses in the THz and good mode confinement and overlap with the pumps. FIG. 6 is the electric field profile of the phase matched THz mode. The THz mode is well confined to the AlGaAs core layers with a low mode absorption coefficient of $\alpha_3=1.5$ cm$^{-1}$.

EXAMPLE 3

THz Detection Using a AlGaAs-Based Dual Waveguide

Figure 7:
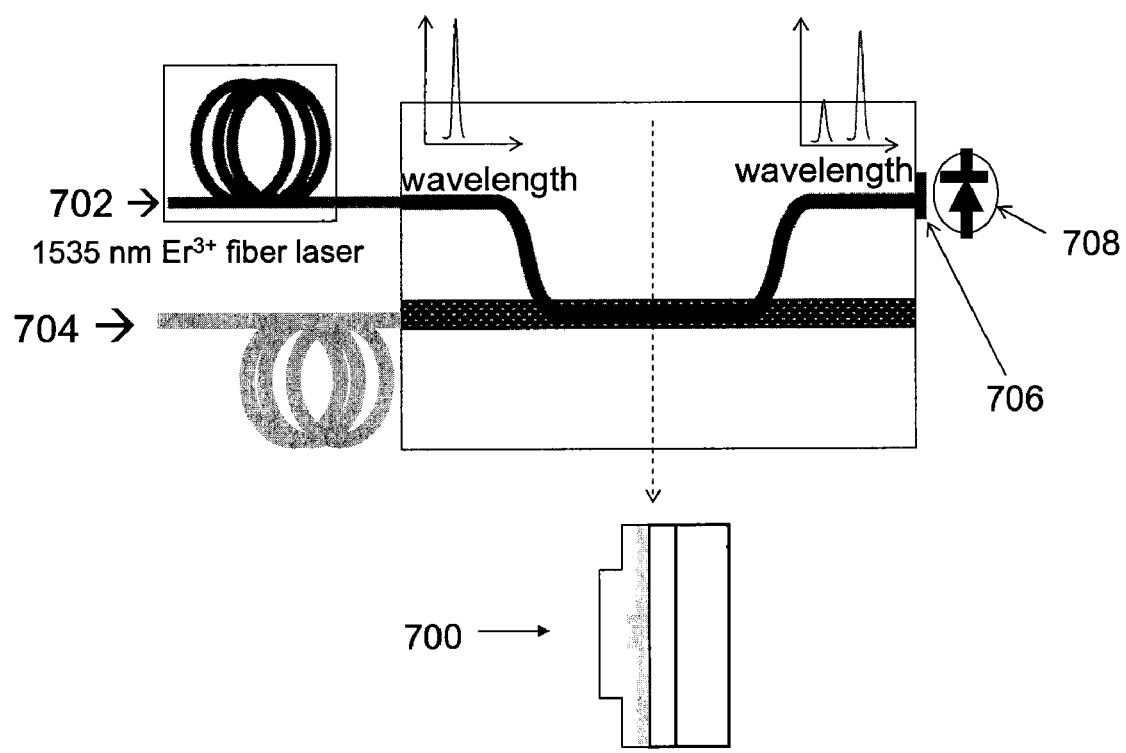
FIG. 7 illustrates the use of a nested waveguide as a THz radiation detector.

The same nested waveguide structure of Example 1 could also be used to detect THz radiation by employing the complementary processes of DFG or SFG. In this case, the THz radiation to be detected would act as a pump beam that interacts with a second pump beam to generate a product beam via DFG, thereby indicating the presence of the THz radiation. In this mode of operation, which is illustrated schematically in FIG. 7, a pump beam 702, e.g., at 1535 nm, is provided to overlap the guided THz radiation 704 to be detected at 100.47 μm. The same phase matching condition which produced THz via DFG, $\beta_3=\beta_1-\beta_2$ in Example 1, will now produce a longer wavelength (smaller frequency) product (in this example, 1563 nm) by the same phase-matched DFG, viz., $\omega_2=\omega_1-\omega_3$ with $\beta_2=\beta_1-\beta_3$. Of course 1563 nm radiation could also be used as the second input pump, thereby producing 1535 nm output as a result of SFG mixing the detected THz radiation (100.47 μm) and the 1563 nm pump radiation by SFG (($\omega_1=\omega_2+\omega_3$) with $\beta_1=\beta_2+\beta_3$). Both of these processes have the advantage that they create an optical signal proportional to the intensity of the input THz radiation in a region of the spectrum (here, the near-IR) where the background thermal noise (blackbody radiation) is much smaller than that present behind the THz signal. The phase of the resulting near-IR product bears a fixed relation to the phase of the THz input, and thus both intensity and phase information can be recovered.

The THz input radiation can be in the form of a free space propagated wave or waveguided, e.g., by a polyethylene fiber. Both the 1535 nm pump light and the 1563 nm product will be guided by the inner waveguide of the nested waveguide 700. The 1535 nm pump light can be filtered out either by a wavelength selective absorber 706 or by a multilayer dielectric stack (Bragg grating). The intensity of the 1563 nm product can be converted to a current or voltage by a photodetector 708 (InGaAs or Ge). The magnitude of the electrical signal will be proportional to the intensity of the THz input.

Both the source of Example 1 and the detector of Example 3 can be monolithically integrated using standard semiconductor processing tools for GaAs. In the first case, the source would be a line source; in the second case the detector would be a 1-D detector.

For the purposes of this disclosure, and unless otherwise specified, "a" or "an" means "one or more." All patents, applications, references, and publications cited herein are incorporated by reference in their entirety to the same extent as if they are individually incorporated by reference.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art, all language such as "up to," "at least," "greater than," "less than," and the like includes the number recited and refers to ranges which can be subsequently broken down into subranges as discussed above. Finally, as will be understood by one skilled in the art, a range includes each individual member.

It is understood that the invention is not confined to the particular embodiments set forth herein as illustrative, but embraces all such modified forms thereof as come within the scope of the following claims.

What is claimed is:

1. A nested waveguide, comprising:
   a first waveguide configured to guide at least one pump beam; and
   a second waveguide configured to guide at least one product beam generated via a nonlinear optical process from the at least one pump beam,
   wherein one of the first or second waveguides is embedded within the other of the first or second waveguides.

2. The nested waveguide of claim 1, wherein the first waveguide is embedded within the second waveguide.

3. The nested waveguide of claim 1, wherein the first waveguide and the second waveguide are longitudinally aligned along the direction of propagation of the at least one pump beam.

4. The nested waveguide of claim 1, wherein the embedded waveguide comprises:
   a first inner cladding layer comprising a non-linear optic material;
   a second inner cladding layer comprising a non-linear optic material; and
   a core layer comprising a nonlinear optic material sandwiched between the first and second inner cladding layers.

5. The nested waveguide of claim 4, further comprising at least one outer cladding layer disposed outside of the first or second inner cladding layers.

6. The nested waveguide of claim 4, further comprising a first outer cladding layer and a second outer cladding layer, wherein the first and second inner cladding layers are sandwiched between the first and second outer cladding layers.

7. The nested waveguide of claim 4, wherein the core layer comprises a compound semiconductor material having a first refractive index and the first and second inner cladding layers comprise compound semiconductor materials having refractive indices that are lower than first refractive index.

8. The nested waveguide of claim 5, wherein the core layer comprises a first gallium arsenide-based material, and the first and second inner cladding layers comprise a second gallium arsenide-based material having an aluminum concentration higher than that of the first gallium arsenide-based material.

9. The nested waveguide of claim 8, wherein the at least one outer cladding layer comprises silicon.

10. The nested waveguide of claim 8, wherein the first gallium arsenide-based material is GaAs and the second gallium arsenide-based material is $Al_xGa_{1-x}As$, wherein x>0.

11. The nested waveguide of claim 8, wherein the first gallium arsenide-based material comprises $Al_xGa_{1-x}As$ and $x \geq 0.16$.

12. The nested waveguide of claim 11, wherein the first gallium arsenide-based material comprises $Al_{0.16}Ga_{0.84}As$ and the second gallium arsenide-based material comprises $Al_{0.18}Ga_{0.82}As$.

13. The nested waveguide of claim 4, wherein at least one of the first and second inner cladding layers includes a ridge portion configured to provide lateral confinement of the product beam.

14. The nested waveguide of claim 1, wherein embedded waveguide is configured to guide input radiation comprising two optical pump beams and the nonlinear optical process is difference frequency mixing.

15. The nested waveguide of claim 1, wherein the embedded waveguide is configured to guide an output beam generated by second harmonic generation.

16. The nested waveguide of claim 12, wherein the radiation generated via the nonlinear process has a frequency of at least 0.5 THz.

17. A method for generating or detecting radiation using a nested waveguide comprising a first waveguide embedded within a second waveguide, the method comprising directing input radiation comprising at least one pump beam into the nested waveguide, wherein the at least one pump beam is guided by one of the first or second waveguides and output radiation comprising at least one product beam is generated via a nonlinear optical process from the input radiation, and further wherein the at least one product beam is guided by the other of the first or second waveguides.

18. The method of claim 17, wherein the input radiation comprises two optical pump beams which are guided by the first waveguide and the output radiation is generated via difference frequency mixing and guided by the second waveguide.

19. The method of claim 17, wherein the input radiation comprises a first pump beam guided by one of the first or second waveguides and a second pump beam guided by the other of the first or second waveguides and the output radiation is generated via sum frequency mixing of the first and second pump beams.

20. A system for frequency conversion, comprising:
   at least one input radiation source configured to generate input radiation; and
   a nested waveguide configured to receive the input radiation,
   wherein the nested waveguide comprises:
   a first waveguide configured to guide the input radiation; and
   a second waveguide configured to guide output radiation generated via a nonlinear optical process from the input radiation,
   wherein the one of the first or second waveguides is embedded within the other of the first or second waveguides.

21. The system of claim 20, further comprising at least one optical fiber for propagating the input radiation from the at least one input radiation source to the nested waveguide.

22. The system of claim 20, wherein the embedded waveguide comprises:
   a first inner cladding layer comprising a non-linear optic material;
   a second inner cladding layer comprising a non-linear optic material; and
   a core layer comprising a nonlinear optic material sandwiched between the first and second inner cladding layers.

* * * * *